Patented Jan. 14, 1941

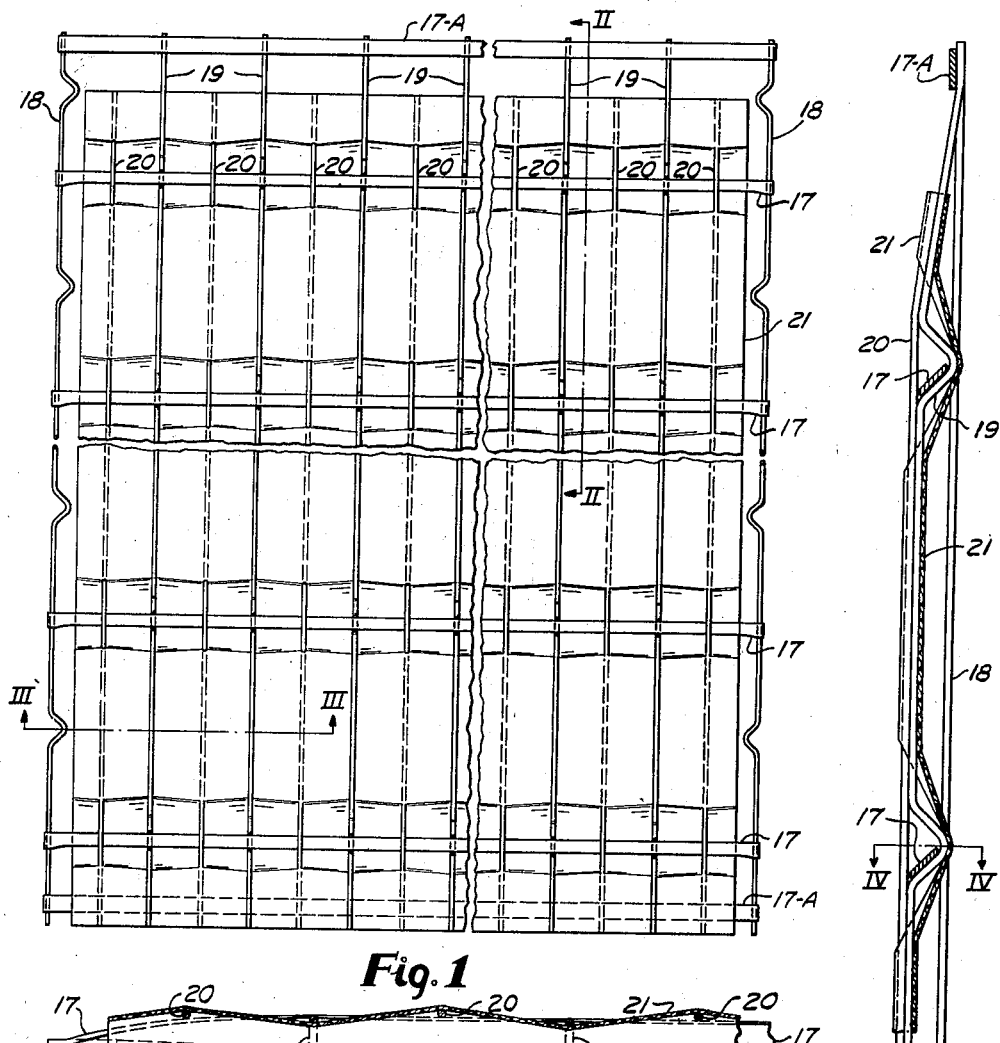

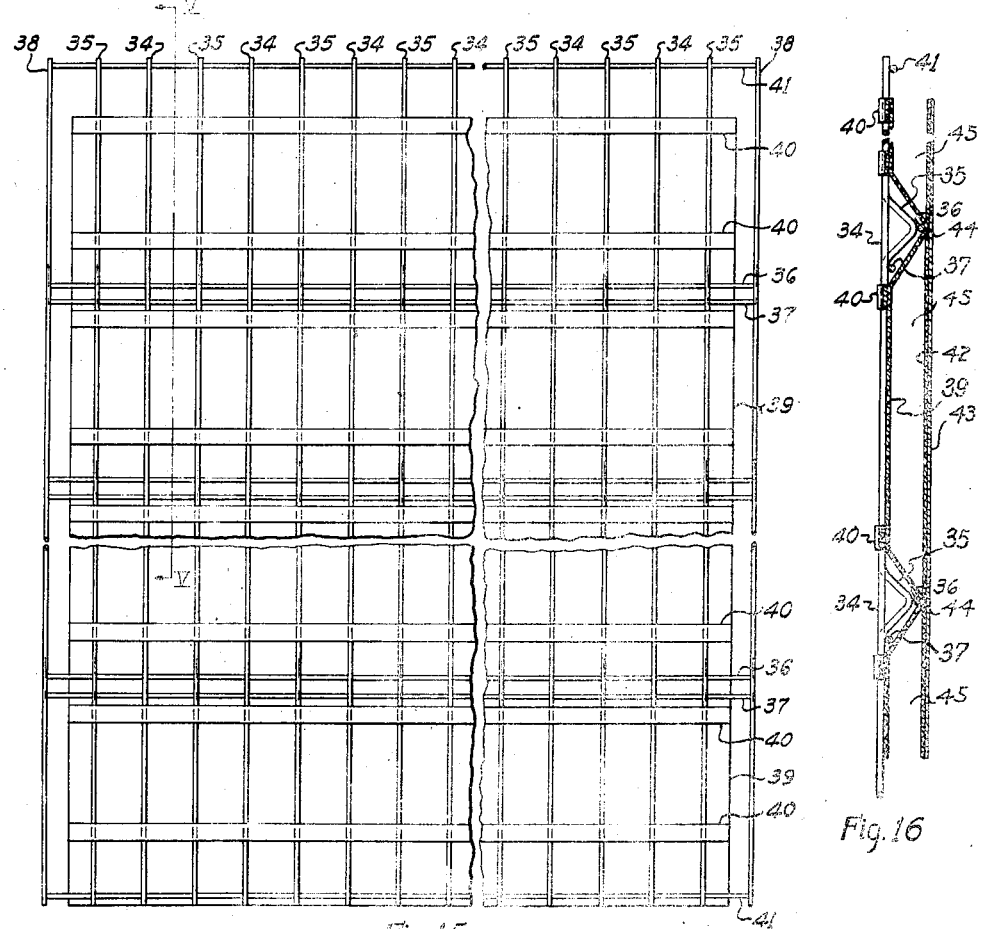

2,228,387

UNITED STATES PATENT OFFICE 2,228,387

PLASTER GROUND

Walter S. Edge, Pittsburgh, Pa., and Alfred J. Edge, Savannah, Ga.

Application April 26, 1937, Serial No. 138,974

11 Claims. (Cl. 72—116)

Our invention relates to reinforcement mesh that is particularly adapted for use in the building of walls, ceilings and floors, etc., where reinforcement is desired for a body or slab or plaster, concrete, stucco material, or the like.

This invention is especially applicable to that class of structures wherein a wire mesh reinforcement is employed for plastic material such as plaster, concrete, etc., and is backed by a form sheet of paper, wire cloth, burlap or other more or less flexible material, the composite mesh and sheet being frequently designated as "plaster ground" or "plaster base."

One object of our invention is to provide a plaster base of unusual rigidity to enable it to be easily handled and nailed or otherwise fastened in place.

Another object of our invention is to provide a plaster base of unusual stiffness after erection so that it will withstand the action of the plasterer's trowel and avoid the use of an excessive amount of plaster.

Another object of our invention is to provide a plaster base of such form that the plaster body formed thereon will be of greater strength, relative to its thickness and weight, as compared to forms of structures heretofore employed.

Another object of our invention is to provide a mesh of such form that it will form a truss rib or beam in the flat plaster slab of considerable depth in directions perpendicular to the plane of the structure.

Another object of our invention is to provide a mesh structure of such rigidity that it will enable the product to be used in floor construction where it must support considerable vertical loads of wet concrete or mortar before the same has set.

Still another object of our invention is, by means of the ribbed construction, which we employ in plaster work, to permit only small contact with supporting studs to which it is nailed, so that the pattern of the supporting studs will not show through the finished plastered surface, a defect common to many other forms of plaster base.

Still another object of our invention is to provide a plaster base of very efficient and economical form.

It will be understood that it is imperative that a plaster base of the type herein described should have sufficient stiffness to enable it to be easily handled before and during erection. Also it must be stiff enough and resilient enough to withstand the pressure due to the plasterer's trowel or the weight of the wet suspended plaster, if it is used on a ceiling, or the downward pressure due to men walking on it or the weight of wet concrete, if it is used in floor construction. In the application of Walter S. Edge, No. 94,985, filed August 8, 1936 now Patent 2,103,897, this result was accomplished in part by the positioning of two adjacent paralleled wires, one in the general plane of the welded fabric and the other slightly behind it and connecting them by welding cross wires to both to form in reality, a miniature truss of small depth but with surprising stiffness. These parallel trusses, though part of the reinforcing mesh and functioning with it to reinforce the plaster which is later applied to the base, nevertheless, do stiffen the entire structure in a very satisfactory manner, both before and during the operation of plastering. In developing the base above referred to, a number of other types and modifications were evolved and tested and we hereby wish to secure a patent to cover these modifications of the original idea.

The backing sheet forms a very vital part of this type of plaster base. Its function is quite temporary but very important. Its cost represents a considerable part of the entire cost. In our experiments with papers we have found that a truly water-proofed paper, for example, one treated with asphalt, will almost completely prevent evaporation of the water contained in mortar made from a mason's plaster and under certain conditions, it may cause the plaster to "rot" i. e. prevent evaporation of the water contained in mortar made from plaster thus preventing it from hardening properly. On the other hand such a paper will prove entirely satisfactory with Portland cement stucco or concrete. We have also found that the adhesion of mortar to the smooth calendered surface of some papers is very poor. We have found that the adhesion of wet mortar to the paper backing depends more upon the roughness of its surface or the looseness of its surface fibers, than it does on the porosity of the paper. We are able to take a smooth calendered paper, to which mortar failed to adhere, and render it most satisfactory by simply wire-brushing the dry surface on which the mortar was to be applied.

It is desirable and necessary on account of the way the second coat of wet plaster may be applied, that a paper used for backing retains a large portion of its strength for twenty minutes after the first coat is applied. Most porous papers formerly used as backing sheets retain less than one twentieth of their tensile strength when under wet mortar for twenty minutes. A suitable type of "sized" and hard calendered paper made from the same pulp as the porous paper, above referred to and wire-brushed on one side to loosen its surface fibers, retained four times the tensile strength of the porous paper under the same test although the porous paper weighed two hundred pounds and the other paper eighty pounds for a surface area of two thousand eight hundred and eighty square feet. Thorough tests have shown the superiority of a paper of this kind with its surface formed rough and fibrous during manufacture, or rendered so after manufacturing and the economic saving is so great as to cause a radical change in our practice in the building industry. We have also found that a very satisfactory paper for our purpose can be produced on a standard paper machine as follows. The fibers in the pulp are "sized" with rosin to render them more water resistant. The smoothing rolls ahead of the driers are removed and the calendering of the finished paper is eliminated. The result is a rough surface paper of high wet strength to which wet mortar will adhere in a very satisfactory manner.

In application, 94,985, the transverse wires are crimped to produce the stiffening effect desired, see 14, in Figures 2 and 5 of that application. This has a tendency to decrease the reinforcing value of transverse wires because they tend to straighten out under tension. In the type of plaster base therein described this tendency is resisted by the stitch wires, 16. In the present application we disclose other ways of supporting the backing sheet, which eliminate the stay wires. To avoid the tensile weakness of crimped wires, we disclose several methods of either eliminating the crimp in the transverse wires entirely or of stiffening it so that it does not constitute a weakness.

In our tests we have found that the points at which the separate sheets of plaster base overlap, are the weakest points in the construction and where cracks are most likely to form. We have therefore developed two methods of strengthening such joints. The basic idea in application 94,985 was to produce stiffness and "furred" support for the plaster by means of ribs which were formed of wire and gave stiffness to the sheet during construction and acted to reinforce the plaster during the life of the structure. We will now disclose some other methods of obtaining similar results.

In the accompanying drawings, Figure 1 is a front view of a wire fabric and backing sheet combined, Figure 2 is a sectional view on line II—II showing the stiffening ribs in section. Figure 3 is a sectional view on line III—III parallel to the ribs, Figure 4 is a sectional view on line IV—IV showing the stiffening rib in elevation and Figure 5 is a sectional view similar to Figure 2 except that it shows the plastered slab complete. Figure 6 is a sectional view of a pair of ribs similar to those just shown except that additional wires are welded into the fabric parallel to the rib. Figures 7 and 8 show a section and plan of another method which we have employed to form a stiffening member for a plaster base. Figure 9 shows still another method which may be used successfully. Figures 10 and 11 are a sectional view and plan of another simple but very effective way of stiffening the structure. Figure 12 is another arrangement which we have used with success and Figures 13 and 14 are a section and plan of another design which is cheap and effective. Figure 15 is a plan of a sheet similar in general design to that shown in Figure 1 except in two important details, which are made more clear in Figure 16, which is an enlarged section on line V—V.

Referring again to Figure 1, we see that it consists of a sheet of metal fabric composed of longitudinal ribs made from flat wires or thin strips of light gage metal, 17, welded to transverse wires, 18 and 19. After welding, the sheets are crimped along the lines of the longitudinal members, 17 as shown in Figure 2 to stiffen the sheet. The edge wires, 18 are crimped in the horizontal plane to compensate for the vertical crimping in the rest of the sheet, and in this way a thin edge is formed as shown in section, Figures 3 and 4, facilitating lapping of sheets at vertical joints.

After forming, the fabric sheet is combined with a backing sheet, 21, of paper, fine wire mesh, or burlap, or the like, to act as a support for plaster. This sheet is held in position and supported by lacing wires, 20, which are either spring wire or low carbon, hard drawn wire, having spring-like qualities. In assembling, the backing sheet is forced through the openings in the fabric and the lacing wires are forced through above the longitudinal flat wires 17, and through the backing sheet so that when completed it is supported and held in position elastically by the resiliency of the lacing wires. This construction enables the backing sheet to yield slightly under the pressure of the plasterer's trowel, allowing the wet plaster to flow all around the steel members. The resiliency of the lacing wires forces the backing sheet to return almost to its original position, thus insuring complete coverage of the reinforcing steel but preventing any waste of mortar.

At the upper and lower edges of the sheet, Figure 1, it will be seen that longitudinal members 17, near their ends, are turned flatwise with respect to the plane of the sheet. This is done for two reasons. First it enables us to form thin horizontal joints when used on sidewalls, for example, and second, when sheets are lapped properly, it produces a joint of exceptional strength as developed by our tests. A moment's reflection will show that this is due to the stiffness of the flat wire, 17, turned as it is, to provide the greatest possible resistance to the pull of wires 18 and 19.

Figure 5 shows a vertical section through a base which has been plastered. It will be seen that the mortar, 22 completely encases the steel reinforcement. As this base is ordinarily used, the ribs run at right angles to the supports. It is evident therefore that the base contacts the supports on a series of lines, completely preventing the pattern of the joists showing through the plaster. This is a defect very common to other forms of plaster bases. It will be seen that considerable unnecessary plaster is eliminated by this design and in reality we take advantage of the principle of the arch to strengthen the structure.

In Figure 7 we show a section and in Figure 8, a plan of another method we have used to construct a stiffening rib for a plaster base. Here the cross wires, 24 are simply wrapped around the flat wire rib. In this manner, a very stiff fabric can be obtained with no sacrificing of transverse strength.

In Figure 9 we show a section of another fabric in which light gage flat strips, 26 are welded to cross wires 27 and then the combination is crimped along the longitudinal center line of strip 26. The assembly or welding may be done after forming, if preferred. This forms a very efficient and stiff construction.

In Figures 10 and 11 we show a section and plan of still another construction in which transverse wires, 28 are welded to the edge of flat wire ribs, 29 producing a very efficient and simple fabric which lends itself very readily to our uses. Such a fabric can be still further strengthened by using flat wires in both directions.

In Figure 12 a very stiff construction is obtained by crimping transverse wires, 30 and welding two longitudinal wires 31 between them. This forms a very efficient fabric and provides full reinforcing efficiency in both directions.

In Figures 13 and 14, we show a simple method of stiffening a welded wire mesh by welding other longitudinal wires directly opposite the first series on the opposite side of the fabric thus producing what is equivalent to a series of trussed ribs.

In all these developments we have taken advantage of the various qualities of certain steels for special purposes. This is disclosed in the application by Walter S. Edge, Serial 94,985, filed August 8, 1936, and will be further developed here.

The strength of so called low carbon wire will vary from under 60,000 pounds per square inch to over 115,000 pounds per square inch, depending on the amount of cold work, i. e. drawing, and whether or not it has been annealed and how this has been done. It has been the common opinion among those skilled in the art that hard drawn low carbon wire could not be welded satisfactorily. We have shown that this is not true but we have also shown that certain methods must be used to produce satisfactory results from a strength standpoint. By using a hard drawn low carbon wire for the longitudinal members of the fabric, we take advantage of its superior stiffness and strength which is obtained, incidentally, at no increase in cost per pound of material. Combining this high grade wire with a softer material used in the transverse wires, we obtain a fabric which can be readily crimped or deformed without danger of fracturing either the wires or the welds, a very important property.

In Figures 15 and 16, we show still another modification of our basic idea which has a number of practical applications. Here again the principle of a combination of two or more grades of steel to fit their particular use, is employed with particular success.

Figure 15 shows a plan view of a plaster base similar to that shown in Figure 1. It consists of a sheet of welded wire mesh in which longitudinal members 36 and 37 are straight and preferably made from low carbon hard drawn wire. Welded to these at certain points are cross wires 34, 35 and 38. Wires 38 and 35 are welded at every intersection to longitudinal wires 36 and 37. Wires 34 are welded at their intersection with 37 only. When this fabric is crimped, wires 38 and 34 are not crimped but remain straight and wires 35 are held or gripped at certain points so that when the crimping die comes down and pushes wire 36 down, it actually stretches wires 35 to form the crimp. Wires 35 being soft will stand this treatment without fracture. This is a valuable principle which we have used in a number of other ways to produce excellent results very economically.

It is evident from a study of Figs. 15 and 16 that the crimping of wires 35 produces a structure in which only part of the cross wires are crimped to form furring bends, the remainder of the cross wires 38 and 34 being straight and undistorted. If such a fabric were subjected to tension in a direction parallel to the cross wires 34, 35 and 38 it would strongly resist the force due to the straight wires 34 and 38. If all the cross wires had been crimped, as is the usual practice, this would not be the case and the fabric would straighten out at the bends causing cracks in plaster or cement stucco in which the mesh might be embedded. We have produced a similar result in ordinary rectangular wire mesh, in which every intersection was rigidly connected, by restraining the longitudinal wires 41 and 37 and then crimping certain of the cross wires 35 either between the longitudinal wires or directly at the longitudinal wires. In the process the cross wires which are crimped are also stretched slightly. Since the longitudinal wires 41 and 37 are restrained during the crimping process the fabric is not distorted by the operation. Obviously the same final result could be obtained by crimping wires 35 during the process of welding and by this means the need for the stretching of certain of the cross wires could be avoided.

In Fig. 16 it will be noticed that wires 37 and 44 are located under wires 34 and 35. By this or similar means the backing sheet 39 is maintained in spaced relation with the bent wires 35 so that when wet mortar is applied to the sheet it will completely surround and encase these wires. This would not be the case if the backing sheet was not maintained in its proper position by wire 44 or by other suitable spacing means but was allowed to press directly against the rear of the crimped wires 35.

In Figure 16, it will be noted that the longitudinal wires 36 and 37 are under the transverse wires 38, 34 and 35. It will be seen that the backing sheet is not supported by stitch wires as disclosed in the previous application, before referred to, and in Figure 1, etc. of this application. Our tests of papers of various kinds and of so called water proofed paper has shown that asphalts or asphaltic mixtures not only were the best water proofing materials, but they are excellent as cements for papers. In the design shown in Figures 15 and 16, we therefore use narrow strips of a strong water resisting paper 40 in lieu of stitch wires, and cement them to the front of the backing sheet as shown, thereby producing a very satisfactory plaster base of very low cost. At the back of the sheet of plaster base shown in Figure 16, I have cemented a flat sheet of strong paper, 42 to which is attached a sheet of aluminum foil 43 or any membrane having similar properties. It has been known for some time that a thin sheet of metallic aluminum has the property of reflecting heat rays and therefore may be used for insulating purposes.

In the application of Walter S. Edge No. 137,008 filed April 15, 1937, having to do with the insulation for buildings, the idea is disclosed of creating air cells integral with a plaster base and we now wish to amplify this idea by incorporating an insulating metallic sheet with the plaster base. It will be seen that the paper sheet 42 is connected to the ribs of the plaster base at points or rather lines 44 and that air cells 45 are created thereby. In other words, in one sheet of material, the plaster base, we incorporate a support for the plaster and wire reinforcement for same with air cells, which have insulating value, and a sheet of aluminum foil or other membrane having additional insulating value. By the use of such a plaster base having air cells and a sheet of aluminum foil or the like incorporated in it the use of such materials as rock wool, cork or sawdust for insulation may be made unnecessary and the expense of the construction may be greatly reduced.

While we have only shown the aluminum foil and second paper backing as attached to a plaster base in one case, Figure 16, it may be obviously used with the type shown in Figures 1, 2, 3, 4, and 5 and with the type shown in the application by Walter S. Edge No. 94,985 filed August 8, 1936. The same idea or a modification of it may be used with other forms of plaster base and with a base which has a flat back, the paper and the aluminum foil may be crimped at certain points to make them stand away from the back of the plaster base and create the air space desired.

Another advantage of the construction mentioned which we wish to make clear is that it is desirable to use a paper immediately behind the plaster, which has a rough surface, is absorbative of water and to which the plaster will stick. The air space which our construction provides permits the moisture to evaporate as the plaster dries out which it could not do so well if either a water proof paper or aluminum foil were mounted directly on the backing sheet which receives the wet plaster.

Having thus described our invention, we claim as follows:

1. Fabric structure comprising a mesh composed of strand wires and stay wires secured together at certain of their points of intersection, the strand wires having furring bends formed therein and extending rearwardly of the fabric mesh, a backing sheet disposed behind and in spaced relation with the rear side of said bends and having portions deflected forwardly towards the openings in the mesh.

2. Fabric structure comprising a mesh composed of strand wires and stay wires secured together at certain of their points of intersection, the strand wires having furring bends formed therein and extending rearwardly of the fabric mesh, a backing sheet disposed behind and in spaced relation with the rear side of said bends, and means for holding the backing sheet in said position with portions deflected forwardly towards the openings in the mesh.

3. Fabric structure comprising a mesh formed of a series of wires, certain of which have furring bends formed therein, and a second series of wires extending transversely of the first named series, certain wires of said second series being welded underneath the apices of said bends, other wires of said series being welded under the first named series at points intermediate the bends thereof, a backing sheet, and means for holding the said sheet in rearwardly spaced relation to the rear side of said bends.

4. Fabric structure comprising laterally-spaced wires having bends formed therein that project rearwardly from the plane of the said wires, means for maintaining the wires in their proper relative positions, a backing sheet disposed in rearwardly spaced relation to the rear sides of said bends, and means for holding the sheet in said position with portions deflected forwardly towards the plane of the wires.

5. Fabric structure comprising laterally-spaced wires having bends formed therein that project rearwardly from the plane of the said wires, means for maintaining the wires in their proper relative positions, a backing sheet disposed in rearwardly spaced relation to the rear sides of said bends, means for holding the sheet in said position and with portions of the sheet deflected fowardly towards the plane of the wires, and a reinforcing wire extending transversely of the first named wires and connected thereto at points adjacent to the said bends.

6. Fabric structure comprising laterally-spaced wires each having bends formed therein that project rearwardly from the plane of the said wires, the bends in each wire being located in transverse alignment with said bends in the other wires, means for maintaining said wires in their proper relative positions, a backing sheet disposed in rearwardly spaced relation to the rear sides of said bends and means for holding the wires in said position with portions of the sheet deflected forwardly toward the plane of the wires between each series of transversely aligned bends.

7. Fabric structure comprising a mesh formed of a series of wires, certain of which have furring bends formed therein, and a second series of wires extending transversely of the first-named series, certain wires of said second series being welded behind the apices of said bends, and a backing sheet supported against the rear side of the last-named wires.

8. A plaster ground comprising a series of laterally spaced wires extending in the same general direction, a series of transverse members secured to said wires and forming therewith a reinforcement mesh, certain ones only of the said wires having rearwardly-projecting furring bends formed therein, the bends of the various wires being arranged in rows transversely of the mesh, and a backing sheet disposed rearwardly of said bends but deflected forwardly and secured to the mesh at points between said rows.

9. A plaster ground comprising reinforcement mesh, a backing sheet therefor, and means for holding the mesh and the sheet in assembled relation, the sheet being of hard, calendered paper which is roughened on its plaster-receiving surface to loosen the fibers.

10. A plaster ground comprising reinforcement mesh, a backing sheet therefor, and means for holding the mesh and the sheet in assembled relation, the sheet being of sized paper which is roughened on its plaster-receiving surface to loosen the fibers.

11. Fabric structure comprising a mesh formed of a series of wires, some of which have furring bends formed therein, the bends in each wire being arranged in laterally-alined relation to the bends in the other wires, a stiffening member of generally flat form welded to one side of the bends in each alined row, and a backing sheet disposed rearwardly of said stiffening members, the extremities of the stiffening members being turned in a direction generally flatwise with respect to the plane of the mesh.

WALTER S. EDGE.
ALFRED J. EDGE.